(12) United States Patent
Ishii

(10) Patent No.: US 11,670,457 B2
(45) Date of Patent: Jun. 6, 2023

(54) CERAMIC ELECTRONIC COMPONENT AND METHOD OF MANUFACTURING THE SAME

(71) Applicant: TAIYO YUDEN CO., LTD., Tokyo (JP)

(72) Inventor: Keisuke Ishii, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 130 days.

(21) Appl. No.: 17/216,223

(22) Filed: Mar. 29, 2021

(65) Prior Publication Data
US 2021/0304969 A1 Sep. 30, 2021

(30) Foreign Application Priority Data

Mar. 31, 2020 (JP) .............................. JP2020-062961

(51) Int. Cl.
| | |
|---|---|
| *H01G 4/30* | (2006.01) |
| *H01G 4/012* | (2006.01) |
| *H01G 4/008* | (2006.01) |
| *C04B 35/468* | (2006.01) |
| *H01G 4/12* | (2006.01) |

(52) U.S. Cl.
CPC ........... *H01G 4/30* (2013.01); *C04B 35/4682* (2013.01); *H01G 4/008* (2013.01); *H01G 4/012* (2013.01); *H01G 4/1227* (2013.01); *C04B 2235/6562* (2013.01)

(58) Field of Classification Search
CPC ...... H01G 4/008; H01G 4/012; H01G 4/1209; H01G 4/1227; H01G 4/30; C04B 35/4682
See application file for complete search history.

(56) References Cited

U.S. PATENT DOCUMENTS

| | | | |
|---|---|---|---|
| 10,586,652 B1 * | 3/2020 | Kwon | ..................... H01G 4/224 |
| 2005/0094350 A1 | 5/2005 | Kobayashi et al. | |
| 2013/0208399 A1 * | 8/2013 | Morita | ..................... H01G 4/30 |
| | | | 361/301.4 |
| 2015/0348712 A1 | 12/2015 | Lee et al. | |
| 2022/0208472 A1 * | 6/2022 | Seo | ......................... H01G 4/224 |

FOREIGN PATENT DOCUMENTS

| | | |
|---|---|---|
| JP | 2005-136132 A | 5/2005 |
| JP | 2006-278557 A | 10/2006 |
| JP | 2019-91926 A | 6/2019 |

* cited by examiner

*Primary Examiner* — Nathan Milakovich
(74) *Attorney, Agent, or Firm* — Chen Yoshimura LLP

(57) ABSTRACT

A ceramic electronic component includes a multilayer chip including a multilayer structure, which includes ceramic dielectric layers and internal electrode layers that are alternately stacked, and cover layers respectively disposed on top and bottom faces of the multilayer structure in a first direction in which the dielectric layers and the internal electrode layers are alternately stacked, wherein each of the cover layers includes a relatively high porous section and a first relatively less porous section having a pore ratio less than a pore ratio of the relatively high porous section, the relatively high porous section laterally spreading and spanning an entire length of the cover layer in a second direction orthogonal to the first direction, the pore ratio of the relatively high porous section being 1% or greater, the first relatively less porous section being interposed between the relatively high porous section and the multilayer structure.

7 Claims, 10 Drawing Sheets

CERAMIC ELECTRONIC COMPONENT AND METHOD OF MANUFACTURING THE SAME

FIELD

A certain aspect of the present disclosure relates to a ceramic electronic component and a method of manufacturing the same.

BACKGROUND

High-frequency communication devices typified by smartphones have been multi-functionalized. To reduce voltage fluctuation of a circuit for achieving each function, ceramic electronic components such as multilayer ceramic capacitors have been used as disclosed in Japanese Patent Application Publication No. 2019-91926.

RELATED ART DOCUMENTS

Patent Documents

Japanese Patent Application Publication No. 2019-91926

SUMMARY OF THE INVENTION

The ceramic electronic component has a capacitance section, in which internal electrode layers are stacked with dielectric layers interposed therebetween, and cover layers protecting the capacitance section. However, an external physical shock may generate cracks in the cover layer. The recent demand for higher capacitance and smaller size of ceramic electronic components has led to thinner cover layers. Therefore, cracks in the cover layer generated by the external shock may reach the capacitance section, resulting in deterioration in withstand voltage.

The present discloser has an objective of providing a ceramic electronic component capable of inhibiting a crack from reaching the capacitance section.

The present disclosure provides, in one aspect, a ceramic electronic component including a multilayer chip including a multilayer structure, which includes dielectric layers and internal electrode layers that are alternately stacked, and cover layers respectively disposed on a top face and a bottom face of the multilayer structure in a first direction in which the dielectric layers and the internal electrode layers are alternately stacked, the dielectric layers being mainly composed of ceramic, wherein each of the cover layers includes a relatively high porous section and a first relatively less porous section having a pore ratio less than a pore ratio of the relatively high porous section, the relatively high porous section laterally spreading and spanning an entire length of the cover layer in a second direction orthogonal to the first direction, or spanning a substantially entire length of the cover layer except for lateral end portions of the cover layer, the pore ratio of the relatively high porous section being 1% or greater, the first relatively less porous section being interposed between the relatively high porous section and the multilayer structure.

In another aspect of the present disclosure, there is provided a ceramic electronic component including a multilayer chip including a multilayer structure, which includes dielectric layers and internal electrode layers that are alternately stacked, and cover layers disposed on a top face and a bottom face of the multilayer structure in a first direction in which the dielectric layers and the internal electrode layers are alternately stacked, the dielectric layers being mainly composed of ceramic, wherein each of the cover layers includes a relatively high porous section, and a peripheral section surrounding the relatively high porous section, wherein a pore ratio in the relatively high porous section is greater than a pore ratio in at least a part of the peripheral section, and is 1% or greater.

In the above ceramic electronic component, the pore ratio in the relatively high porous section may be 15% or less.

In the above ceramic electronic component, the pore ratio in the first relatively less porous section may be less than 1%.

In the above ceramic electronic component, the multilayer chip may have a substantially rectangular parallelepiped shape, the internal electrode layers being alternately exposed to two edge faces opposite to each other in the second direction of the multilayer structure, each of the cover layers may include a second relatively less porous section that is located further out than the relatively high porous section in the first direction, a pair of third relatively less porous sections, as the lateral end portions, sandwiching the relatively high porous section therebetween in the second direction in which the two edge faces are opposite to each other, and a pair of fourth relatively less porous sections sandwiching the relatively high porous section therebetween in a third direction perpendicular to the first direction and the second direction, and a pore ratio in the second relatively less porous section may be less than 1%, and a pore ratio in the third relatively less porous section is less than 1%.

The above ceramic electronic component may be configured so that $0.03 \leq T1/T \leq 0.31$, $0.03 \leq T2/T \leq 0.20$, and $0.03 \leq T3/T \leq 0.31$ where T represents a thickness of the cover layer in the first direction, T1 represents a thickness of the second relatively less porous section in the first direction, T2 represents a thickness of the first relatively less porous section in the first direction, and T3 represents a thickness of the third relatively less porous section in the second direction.

Each of the dielectric layers may contain $Ba_{1-x-y}Ca_xSr_yTi_{1-z}Zr_zO_3$ ($0 \leq x \leq 1$, $0 \leq y \leq 1$, $0 \leq z \leq 1$).

An average thickness of each of the dielectric layers may be 1 µm or less.

In another aspect of the present disclosure, there is provided a method of manufacturing a ceramic electronic component, the method including: alternately stacking ceramic green sheets for dielectric layers and conductive pastes for internal electrode layers to form a multilayer structure; disposing a cover sheet on each of outermost layers of the multilayer structure in a first direction, in which the ceramic green sheets and the conductive pastes are stacked, to form a ceramic multilayer structure; and firing the ceramic multilayer structure to form a multilayer chip, wherein in the firing, a first average rate R1 of temperature increase from a start of the firing to a first time is 400° C./hour or greater, a second average rate R2 of temperature increase from the first time to a second time is 20000° C./hour or greater, and a ratio (R2/R1) of the second average rate R2 of temperature increase to the first average rate R1 of temperature increase is 50 or greater.

DETAILED DESCRIPTION

Hereinafter, a description will be given of an embodiment.

EMBODIMENT

Figure 1:
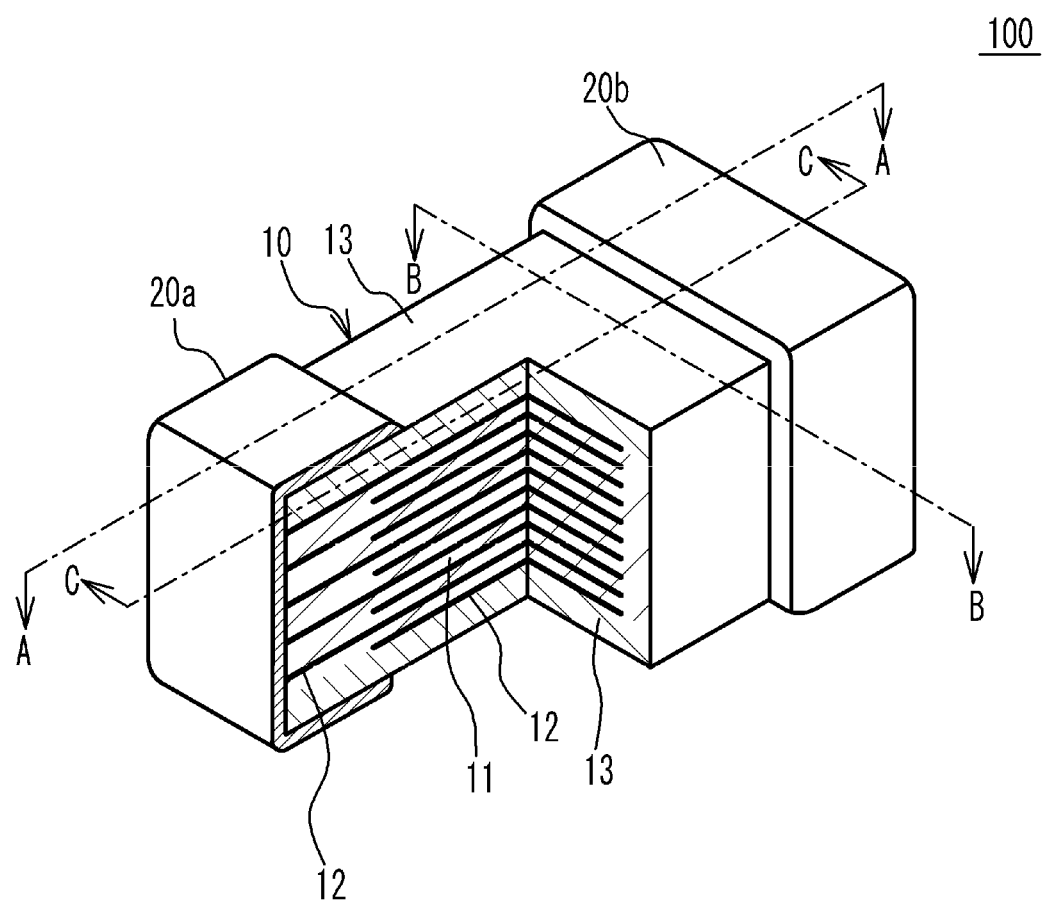
FIG. 1 is a partial cross-section perspective view of a multilayer ceramic capacitor in accordance with an embodiment.
Figure 2:
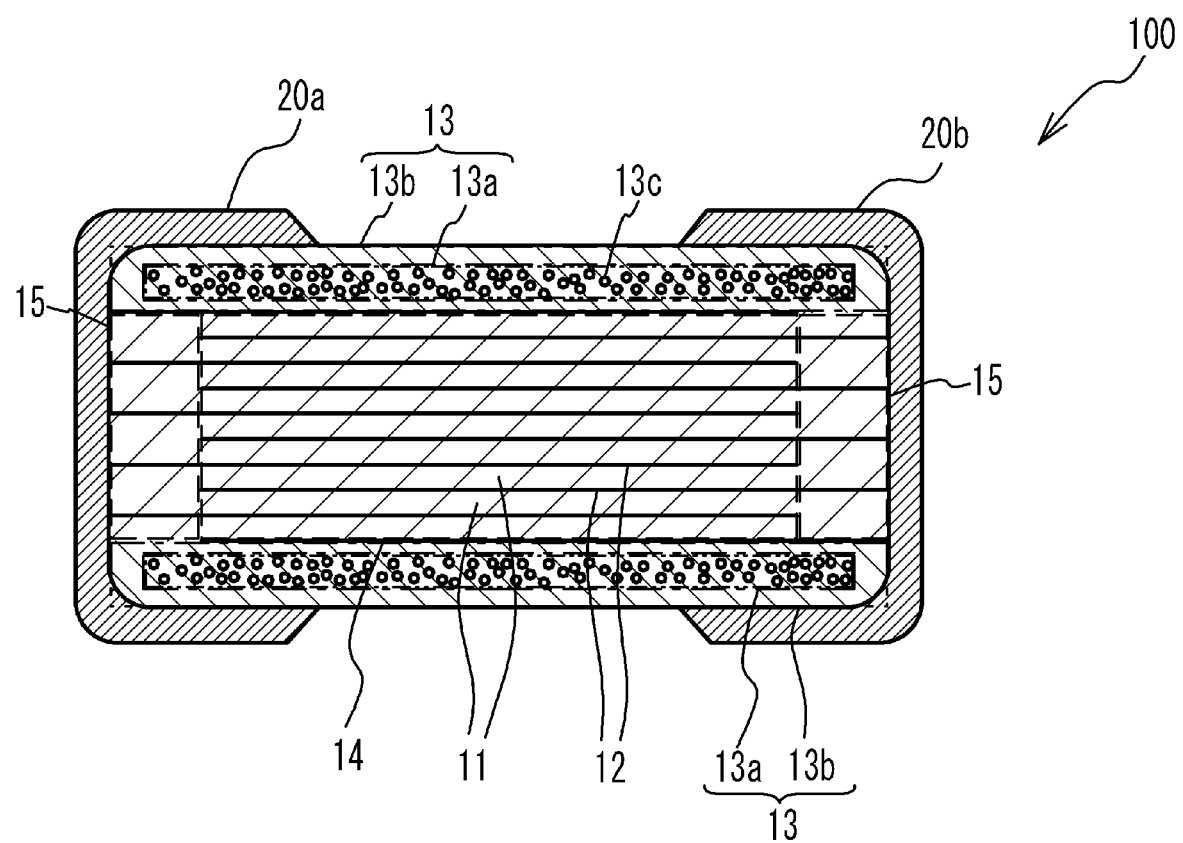
FIG. 2 is a cross-sectional view taken along line A-A in FIG. 1.
Figure 3:
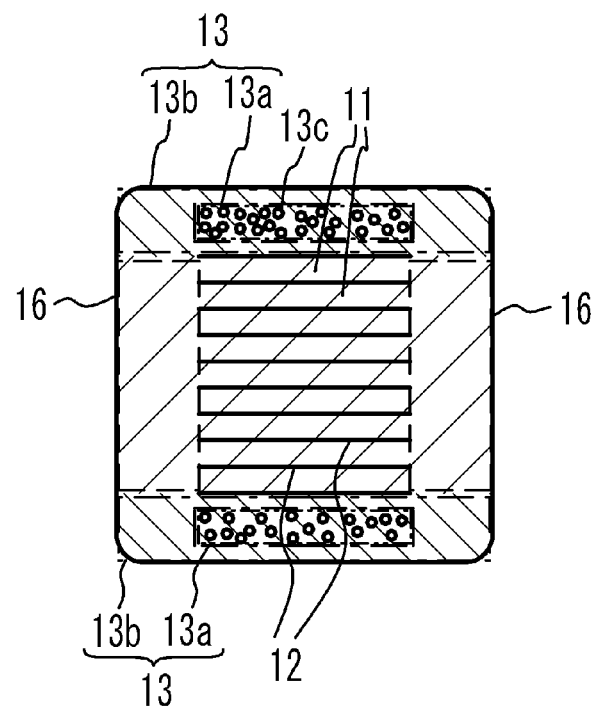
FIG. 3 is a cross-sectional view taken along line B-B in FIG. 1.

FIG. 1 is a partial cross-sectional perspective view of a multilayer ceramic capacitor 100 in accordance with an embodiment. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a substantially rectangular parallelepiped shape, and external electrodes 20a and 20b respectively disposed on two edge faces opposite to each other of the multilayer chip 10.

Among four faces other than the two edge faces of the multilayer chip 10, two faces other than the top surface and the bottom surface in the stack direction (a first direction in which dielectric layers 11 and internal electrode layers 12 are alternately stacked) are referred to as side faces. Each of the external electrodes 20a and 20b extends from the corresponding edge face to the top face and the bottom face in the stack direction and the two side faces of the multilayer chip 10. The external electrodes 20a and 20b are spaced from each other.

The multilayer chip 10 has a structure designed to have the dielectric layers 11 and the internal electrode layers 12 alternately stacked. The dielectric layer 11 contains a ceramic material acting as a dielectric substance. The internal electrode layer 12 contains a base metal material. End edges of the internal electrode layers 12 are alternately exposed to a first edge face of the multilayer chip 10 and a second edge face of the multilayer chip 10 that is different from the first edge face. The external electrode 20a is disposed on the first edge face, while the external electrode 20b is disposed on the second edge face. Thus, the internal electrode layers 12 are alternately electrically connected to the external electrode 20a and the external electrode 20b. As a result, the multilayer ceramic capacitor 100 has a structure in which a plurality of the dielectric layers 11 is stacked with the internal electrode layer 12 interposed between each two of the dielectric layers 11. In the multilayer structure formed of the dielectric layers 11 and the internal electrode layers 12, the outermost layers in the stack direction are the internal electrode layers 12, and the top face and the bottom face of the multilayer body are covered by cover layers 13. A main component of the cover layer 13 is a ceramic material. For example, the main component of the cover layer 13 is the same as the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the dimensions of the multilayer ceramic capacitor 100 are not limited to the above dimensions.

The main component of the internal electrode layer 12 is a base metal such as nickel (Ni), copper (Cu), tin (Sn), or the like. The internal electrode layers 12 may be made of a noble metal such as platinum (Pt), palladium (Pd), silver (Ag), or gold (Au) or an alloy thereof. The average thickness of each of the internal electrode layers 12 is, for example, 1 µm or less. The dielectric layers 11 are mainly composed of a ceramic material having a perovskite structure expressed by a general formula $ABO_3$. The perovskite structure includes $ABO_{3-\alpha}$ having an off-stoichiometric composition. For example, employed as the ceramic material is barium titanate ($BaTiO_3$), calcium zirconate ($CaZrO_3$), calcium titanate ($CaTiO_3$), strontium titanate ($SrTiO_3$), or $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. The average thickness of each of the dielectric layers 11 is, for example, 1 µm or less.

As illustrated in FIG. 2, the section where the internal electrode layer 12 connected to the external electrode 20a and the internal electrode layer 12 connected to the external electrode 20b are opposite to each other is the section where electric capacitance is generated in the multilayer ceramic capacitor 100. Thus, this section where electric capacitance is generated is referred to as a capacitance section 14. That is, the capacitance section 14 is a section where two adjacent internal electrode layers 12 connected to different external electrodes are opposite to each other.

The section where the internal electrode layers 12 connected to the external electrode 20a are opposite to each other with no internal electrode layer 12 connected to the external electrode 20b interposed therebetween is referred to as an end margin section 15. The section where the internal electrode layers 12 connected to the external electrode 20b are opposite to each other with no internal electrode layer 12 connected to the external electrode 20a interposed therebetween is also the end margin section 15. That is, the end margin section 15 is the section where the internal electrode layers 12 connected to one of the external electrodes are opposite to each other with no internal electrode layer 12 connected to the other of the external electrodes interposed therebetween. The end margin section 15 is a section where no electric capacitance is generated.

As illustrated in FIG. 3, in the multilayer chip 10, the section from each of the two side faces of the multilayer chip 10 to the internal electrode layers 12 is referred to as a side margin section 16. That is, the side margin section 16 is a section that covers the edges, extending toward the corresponding side face of the multilayer structure, of the stacked internal electrode layers 12. The side margin section 16 is also a section where no electric capacitance is generated.

As illustrated in FIG. 2, the cover layer 13 has a relatively high porous section 13a in which many pores 13c are formed. The relatively high porous section 13a laterally spreads and spans an entire length of the cover layer 13 in a direction orthogonal to the stack direction, or spans a substantially entire length of the cover layer 13 except for lateral end portions of the cover layer 13. The cover layer 13 also has a peripheral section 13b surrounding or partly surrounding the relatively high porous section 13a. The peripheral section 13b has a pore ratio less than the pore ratio of the relatively high porous section 13a, and hence it is a relatively less porous section as compared with the relatively high porous section 13a.

Here, the ratio of the total area A2 of the pores existing within a predetermined region in a cross-section to the area A1 of the predetermined region in the cross-section is defined as a pore ratio (A2/A1). The pore ratio can be calculated as follows. The multilayer chip 10 is polished so that a cross-section at the center part of the multilayer chip 10 can be observed, and the cross-section is then observed using a scanning electron microscope (SEM). Then, the area A1 of a predetermined region in the field of view is measured, and the total area A2 of the pores existing in the predetermined region is measured. Then, the pore ratio is calculated using the measured values as A2/A1. The ImageJ software can be used as image processing software.

Figure 4A:
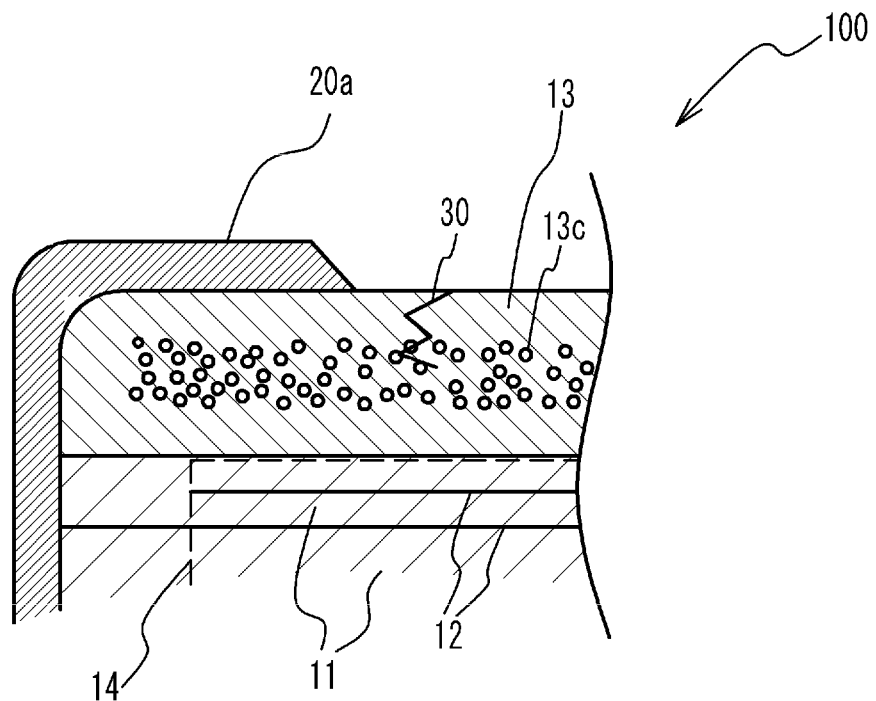
FIG. 4A and FIG. 4B are diagrams for describing extension of a crack.
Figure 4B:
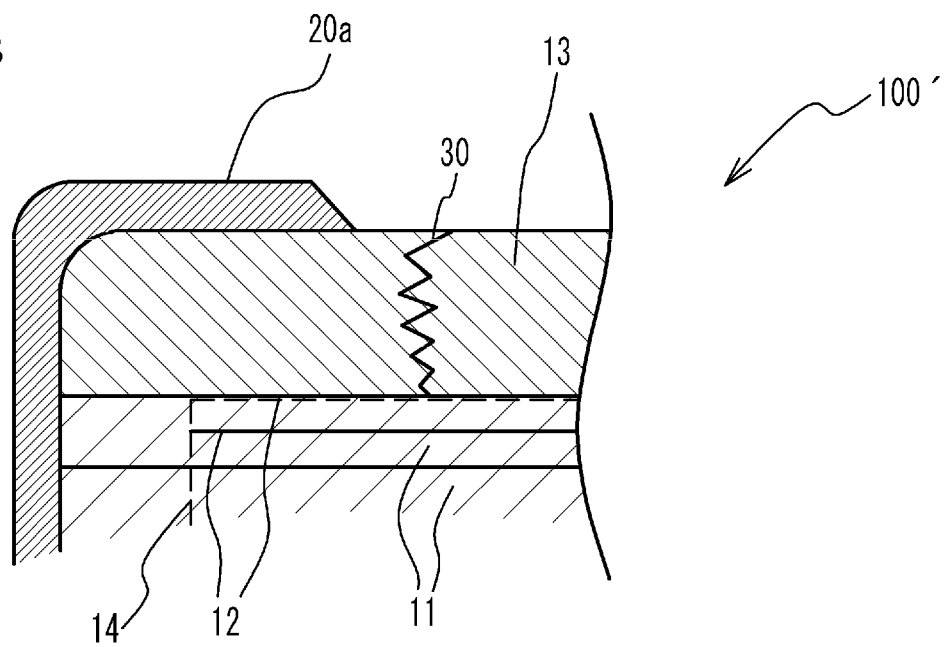

The pore ratio in the relatively high porous section 13a is greater than the pore ratio in the peripheral section 13b, and is 1% or greater. Since the relatively high porous section 13a exists, the cover layer 13 is flexible. Thus, when an external shock is applied to the cover layer 13, the shock is mitigated, and the extension of a crack 30 is inhibited as illustrated in FIG. 4A. Therefore, the crack 30 is inhibited from reaching the capacitance section 14. When the cover layer 13 has no relatively high porous section 13a, the crack 30 generated in the cover layer 13 by an external shock may reach the capacitance section 14 as illustrated in FIG. 4B, resulting in deterioration in withstand voltage.

Figure 5A:
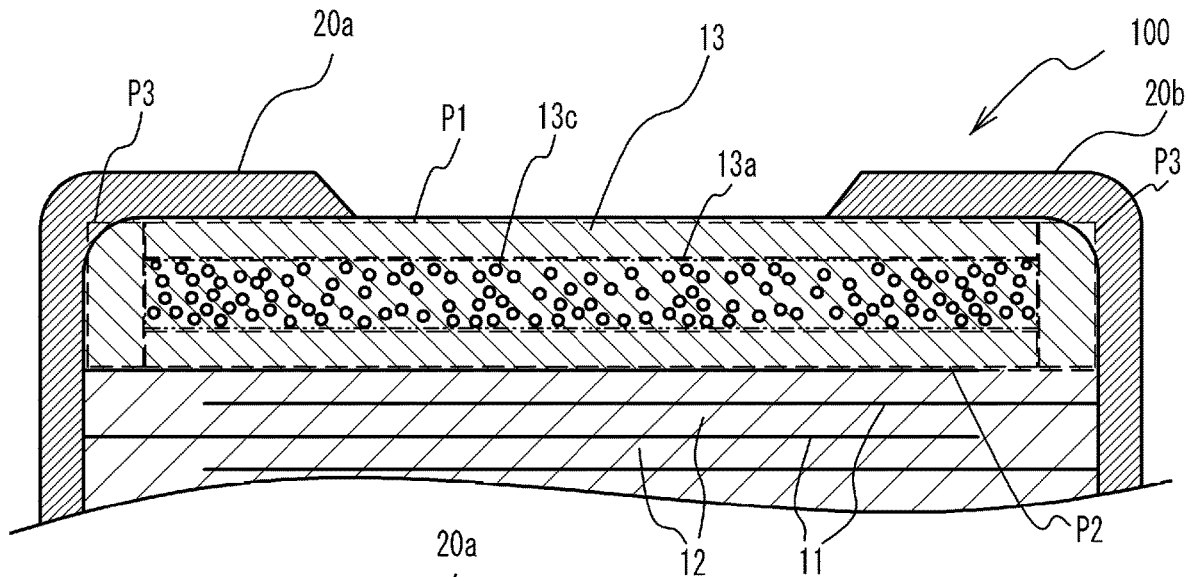
FIG. 5A is an enlarged cross-sectional view of a cover layer.
Figure 5B:
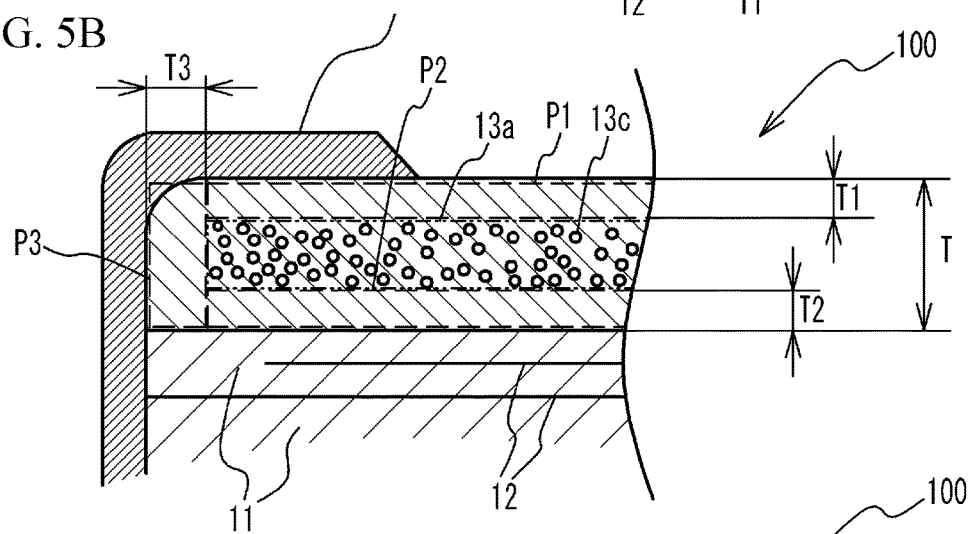
FIG. 5B is a partial enlarged cross-sectional view of the cover layer.
Figure 5C:
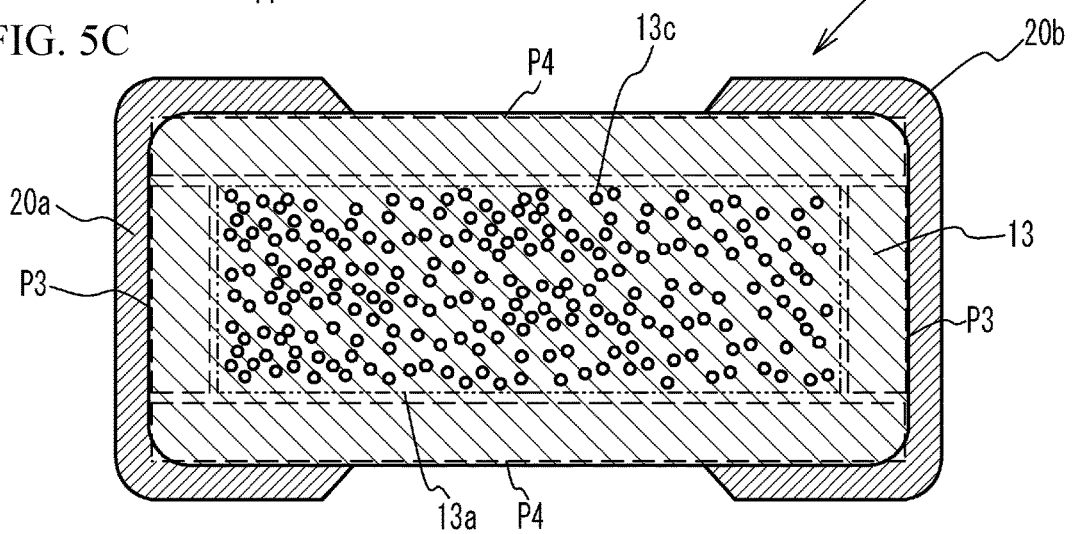
FIG. 5C is a cross-sectional view taken along line C-C in FIG. 1.

As illustrated in FIG. 5A to FIG. 5C, the peripheral section 13b includes a first part P1 (a second relatively less porous section) located further out than the relatively high porous section 13a in the stack direction, a second part P2 (a first relatively less porous section) located further in than the relatively high porous section 13a in the stack direction, a pair of third parts P3 (third relatively less porous sections) sandwiching the relatively high porous section 13a therebetween in the length direction of the multilayer chip 10 (a second direction in which the two edge faces (the external electrodes 20a and 20b) of the multilayer chip 10 are opposite to each other), and a pair of fourth parts P4 (fourth relatively less porous sections) sandwiching the relatively high porous section 13a therebetween in the width direction of the multilayer chip 10 (a third direction in which the two side faces of the multilayer chip 10 are opposite to each other). Here, in some embodiments, the first part P1, the third part P3, and/or the fourth part P4 may not be provided. It is however preferable to have at least the second part P2 that is located between the relatively high porous section 13a and the capacitance section 14.

The relatively high porous section 13a and the peripheral section 13b (relatively less porous sections) and their boundaries are determined as follows. The multilayer chip 10 is polished so that a cross-section at the center part of the multilayer chip 10 can be observed, and the cross-section is then observed using a scanning electron microscope (SEM). In order to determine the relatively high porous section 13a and the part P1/P2 and their respective boundaries, a plurality of measurement spots are defined along the stacking direction of the multilayer structure in the cross-section of the cover layer 13, and at each of the plurality of measurement spots, the pore ratio is calculated from the corresponding SEM image as the area ratio of (the total area of pores)/(the spot area), as described above. This way, local values of the pore ratio are calculated along a vertical virtual line along the stacking direction. Then, two adjacent measurement spots that have the largest difference in pore ratio are identified, and a line between such two adjacent measurement spots is determined as a boundary between the relatively high porous section 13a and the part P1/P2. Needless to say, the side of the higher pore ratio is the relatively high porous section 13a and the other side is part P1 or P2 (the relatively less porous section) depending on whether it is above or below the relatively high porous section 13a.

In order to determine the relatively high porous section 13a and the part P3 and their boundaries, another plurality of measurement spots are defined along in the length direction of the cover layer 13 in the cross-section of the cover layer 13, and at each of such a plurality of measurement spots, the pore ratio is calculated from the corresponding SEM image as the area ratio of (the total area of pores)/(the spot area), as described above. This way, local values of the pore ratio are calculated along a horizontal virtual line perpendicular to the stacking direction. Then, two adjacent measurement spots that have the largest difference in pore ratio are identified, and a line between such two adjacent measurement spots is determined as a boundary between the relatively high porous section 13a and the part P3.

If the boundaries of these sections are not well-defined clear horizontal/vertical lines in the SEM cross-sectional image, the relatively high porous section 13a and the peripheral section 13b (such as P1, P2, etc.) and their boundaries may be determined using a plurality of measurement spots distributed across the cross section in matrix, as follows. Like the above-described method, the multilayer chip 10 is polished so that a cross-section of the center part of the multilayer chip 10 can be observed, and the cross-section is then observed using a scanning electron microscope (SEM). Then, a plurality of measurement spots are defined in matrix (i.e., a two-dimensional array) both in the stacking direction and in the length direction in the cross-section of the cover layer 13 (for example, in an m×n matrix). At each of the plurality of measurement spots, the pore ratio is calculated from the corresponding SEM image as the area ratio of (the total area of pores)/(the spot area), as described above. This way, local values of the pore ratio are calculated at the plurality of measurement spots that are arranged in matrix. Then, two adjacent measurement spots that have the largest difference in pore ratio are identified (if exist) at each row and each column of the matrix of the measurement spots, and a boundary point between such two adjacent measurement spots is determined. All of these boundary points are connected to constitute a boundary line of the relatively high porous section 13a (and the rest is the peripheral section 13b, such as P1, P2, etc., i.e., relatively less porous sections).

In this disclosure, the expression, "relatively less porous," includes a case in which no pores can be observed in the SEM image; that is, a pore ratio of 0%.

By determining the relatively high porous section 13a and the first through fourth parts P1 to P4 this way, the pore ratio in the first part P1 is less than the pore ratio in the relatively high porous section 13a. The pore ratio in the second part P2 is less than the pore ratio in the relatively high porous section 13a. The pore ratio in each of the third parts P3 is less than the pore ratio in the relatively high porous section 13a. The pore ratio in each of the fourth parts P4 is less than the pore ratio in the relatively high porous section 13a. Thus, the pore ratio in the first part P1, the pore ratio in the second part P2, the pore ratio in each of the third parts P3, and the pore ratio in each of the fourth parts P4 are all less than the pore ratio in the relatively high porous section 13a.

To secure moisture resistance, the pore ratio in the second part P2 is preferably 0% to 1%. This is because the presence of the second part P2 with a pore ratio of 0% to 1% located further in than the relatively high porous section 13a in the stack direction inhibits water from penetrating to the capacitance section 14.

To secure plating solution resistance, the pore ratio in the first part P1 and the pore ratio in each of the third parts P3 are both preferably 0% to 1%. This is because the presence of the first part P1 and the third parts P3 with a pore ratio of 0% to 1% located further out than the relatively high porous section 13a inhibits plating solution from penetrating to the capacitance section 14 in the plating process described later.

When the pore ratio in the relatively high porous section 13a is too large, the difference between the pore ratio in the peripheral section 13b and the pore ratio in the relatively high porous section 13a (dense-coarse difference) may become too large, resulting in generation of structural anomaly in the cover layer 13. Therefore, the pore ratio in the relatively high porous section 13a is preferably 15% or less.

To reduce the dense-coarse difference, the pore ratio in the relatively high porous section 13a is more preferably 1% to 10%, further preferably 1% to 5%.

Additionally, as illustrated in FIG. 5B, the thickness of the cover layer 13 in the stack direction in the center part in the width direction and the length direction of the multilayer chip 10 is represented by T. The thickness of the thinnest part of the first part P1 in the stack direction in the center part in the width direction and the length direction of the multilayer chip 10 is represented by T1. The thickness of the thinnest part of the second part P2 in the stack direction in the center part in the width direction and the length direction of the multilayer chip 10 is represented by T2. The thickness of the thinnest part of the third part P3 in the length direction is represented by T3. In this case, it is preferable that $0.03 \leq T1/T \leq 0.31$, $0.03 \leq T2/T \leq 0.20$, and $0.03 \leq T3/T \leq 0.31$. This is because it is difficult to secure the moisture resistance and the plating solution resistance when the ratio of the first part P1, the second part P2, and the third parts P3 to the cover layer 13 is too small. On the other hand, when the ratio of the first part P1, the second part P2, and the third parts P3 to the cover layer 13 is too large, the denseness of the cover layer 13 as a whole increases, the flexibility of the cover layer 13 thereby decreases, and the crack 30 may reach the capacitance section 14 as illustrated in FIG. 4B.

To secure the plating solution resistance, it is preferable that $0.10 \leq T1/T \leq 0.31$, and it is more preferable that $0.20 \leq T1/T \leq 0.31$. To secure the moisture resistance, it is preferable that $0.10 \leq T2/T \leq 0.20$, and it is more preferable that $0.15 \leq T2/T \leq 0.20$. Furthermore, to secure the plating solution resistance, it is preferable that $0.10 \leq T3/T \leq 0.31$, and it is more preferable that $0.20 \leq T3/T \leq 0.31$.

Not to generate the dense-coarse difference inside the relatively high porous section 13a, the average diameter of the pores 13c in the cross-section is preferably 20 μm or less, more preferably 10 μm or less, further preferably 1 to 5 μm.

Figure 6:
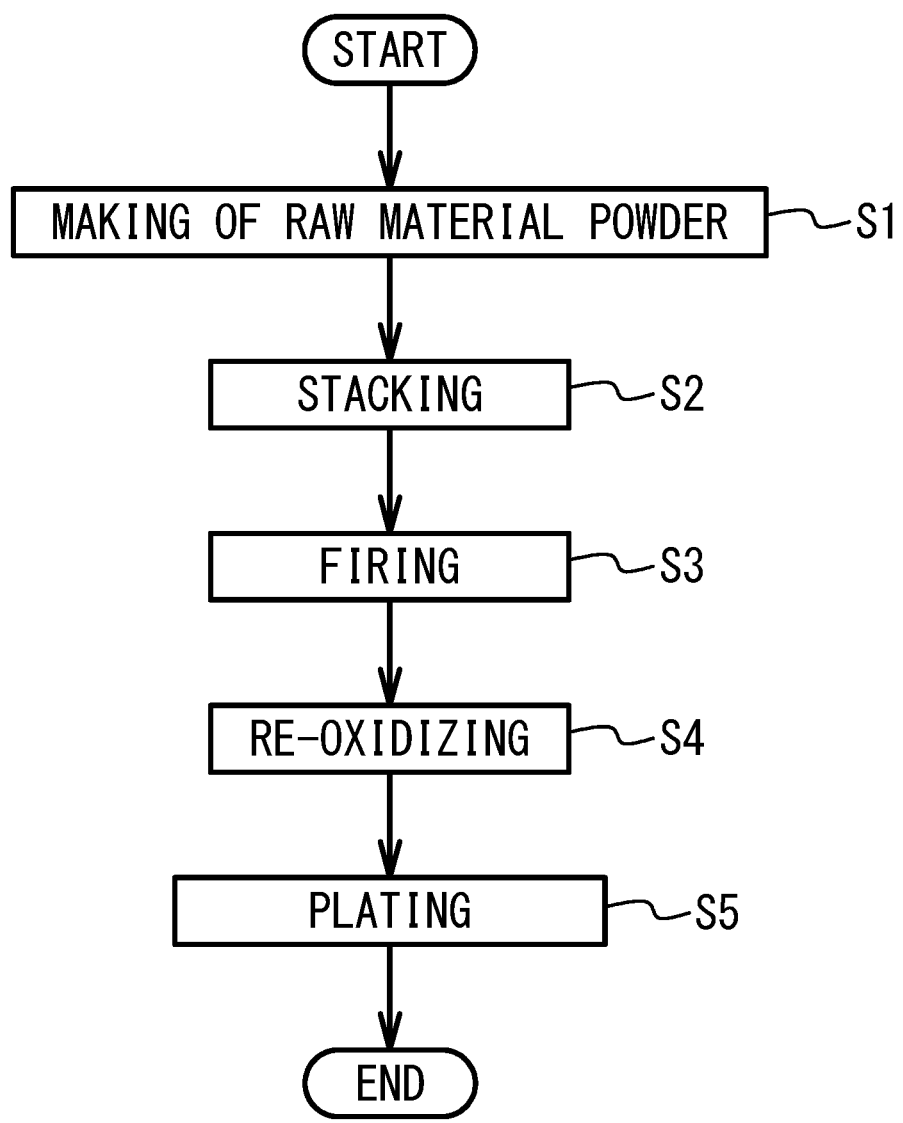
FIG. 6 is a flowchart of a method of manufacturing the multilayer ceramic capacitor in accordance with the embodiment.

A description will next be given of a method of manufacturing the multilayer ceramic capacitor 100 in accordance with the embodiment. FIG. 6 is a flowchart of the method of manufacturing the multilayer ceramic capacitor 100 in accordance with the embodiment.

[Making of Raw Material Powder (S1)]

A dielectric material for forming the dielectric layer 11 is prepared. The dielectric material contains the main component ceramic of the dielectric layer 11. The A site element and the B site element contained in the dielectric layer 11 are contained in the dielectric layer 11 typically in the form of a sintered compact of $ABO_3$ particles. For example, $BaTiO_3$ is a tetragonal compound having a perovskite structure, and exhibits high permittivity. This $BaTiO_3$ can be obtained typically by reacting a titanium raw material such as titanium dioxide with a barium raw material such as barium carbonate to synthesize barium titanate. Various methods have been known as a synthesizing method of the main component ceramic of the dielectric layer 11. For example, the solid phase method, the sol-gel method, the hydrothermal method, and the like are known. Any one of the above methods can be employed in the present embodiment.

Additive compound is added to the resulting ceramic powder in accordance with purposes. The additive compound may be an oxide of zirconium (Zr), calcium (Ca), strontium (Sr), magnesium (Mg), manganese (Mn), vanadium (V), chrome (Cr), or a rare-earth element, an oxide of cobalt (Co), Ni, lithium (Li), boron (B), sodium (Na), potassium (K), or silicon (Si), or glass.

Next, a margin material for forming the end margin section 15 and the side margin section 16 is prepared. The margin material contains the main component ceramic of the end margin section 15 and the side margin section 16. For example, $BaTiO_3$ powder is prepared as the main component ceramic. The $BaTiO_3$ powder can be obtained through the same process of the making process of the dielectric material. Additive compound is added to the resulting $BaTiO_3$ powder in accordance with purposes. The additive compound may be an oxide of Zr, Ca, Sr, Mg, Mn, V, Cr, or a rare-earth element, an oxide of Co, Ni, Li, B, Na, K, or Si, or glass.

Next, a cover material for forming the cover layer 13 is prepared. The cover material contains the main component ceramic of the cover layer 13. For example, $BaTiO_3$ powder is prepared as the main component ceramic. The $BaTiO_3$ powder can be obtained through the same process as the making process of the dielectric material. Additive compound is added to the resulting $BaTiO_3$ powder in accordance with purposes. The additive compound may be an oxide of Zr, Ca, Sr, Mg, Mn, V, Cr, or a rare-earth element, an oxide of Co, Ni, Li, B, Na, K, or Si, or glass. The margin material described above may be used as the cover material.

[Stacking (S2)]

Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet 51 with a thickness of, for example, 0.8 μm or less is coated on a base material using, for example, a die coater method or a doctor blade method, and then dried.

Figure 7A:
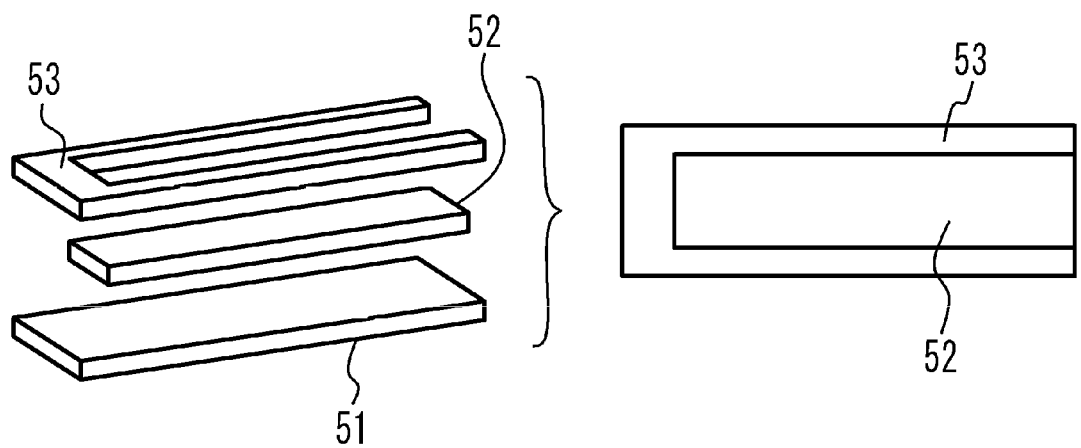
FIG. 7A and FIG. 7B are diagrams illustrating a stacking process.

Next, as illustrated in FIG. 7A, a first pattern 52 of the internal electrode layer is formed on the surface of the dielectric green sheet 51 by printing a metal conductive paste for forming the internal electrode with use of screen printing or gravure printing. The metal conductive paste for forming the internal electrode contains an organic binder. Ceramic particles are added as a co-material to the metal conductive paste. The main component of the ceramic particles is not particularly limited, but is preferably the same as the main component ceramic of the dielectric layer 11.

Next, a binder such as an ethylcellulose-based binder and an organic solvent such as a terpineol-based solvent are added to the resulting margin material and kneaded by a roll mill to obtain a margin paste. As illustrated in FIG. 7A, a second pattern 53 is formed by printing the margin paste in the region where no first pattern 52 is printed on the dielectric green sheet 51 to cause the second pattern 53 and the first pattern 52 to form a flat surface.

Figure 7B:
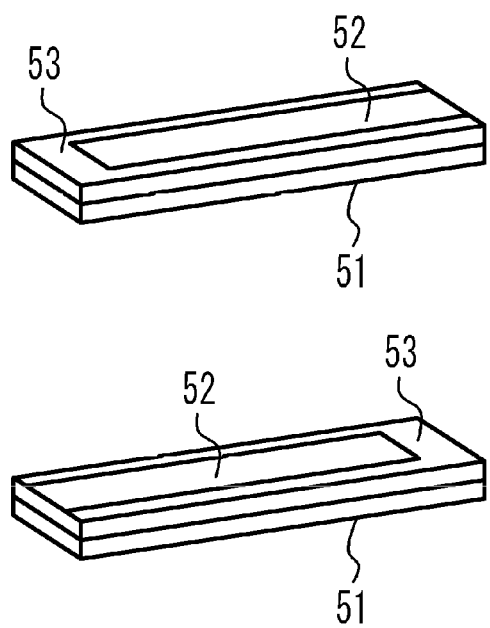

Thereafter, the dielectric green sheets 51, the first patterns 52, and the second patterns 53 are stacked so that the internal electrode layers 12 and the dielectric layers 11 are alternated with each other and the end edges of the internal electrode layers 12 are alternately exposed to both edge faces in the length direction of the dielectric layer 11 so as to be alternately led out to a pair of external electrodes of different polarizations as illustrated in FIG. 7B. For example, 100 to 500 dielectric green sheets 51 are stacked.

Figure 8:
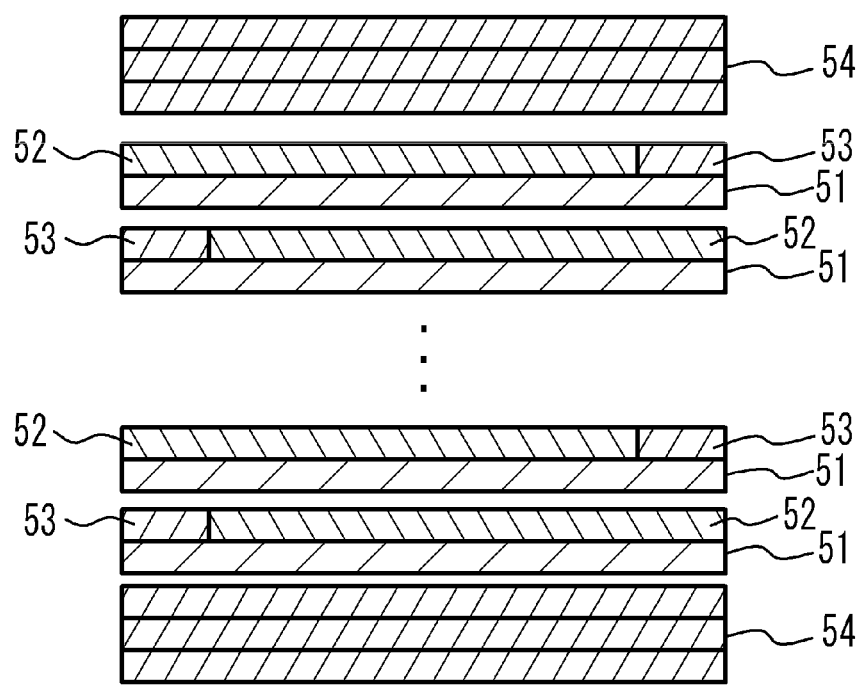
FIG. 8 is a diagram illustrating the stacking process.

Next, a binder such as a polyvinyl butyral (PVB) resin, an organic solvent such as ethanol or toluene, and a plasticizer are added to the resulting cover material and wet-blended. With use of the resulting slurry, a strip-shaped cover sheet 54 with a thickness of, for example, 10 μm or less is coated on a base material using, for example, a die coater method or a doctor blade method, and is then dried. As illustrated in FIG. 8, a predetermined number (for example, 2 to 10) of the cover sheets 54 are stacked on and under the stacked dielectric green sheets 51, and then heated and compressed. The resulting multilayer structure is cut into a predetermined chip size (for example, 1.0 mm×0.5 mm). Thereafter, a metal conductive paste to be the external electrodes 20a and 20b is applied to each of the side faces of the cut multilayer structure by dipping. Through this process, a ceramic multilayer structure is obtained. Note that a predetermined number of the cover sheets 54 may be stacked and compressed, and then attached on and under the stacked dielectric green sheets 51.

In the method illustrated in FIG. 7A to FIG. 8, the section where the part corresponding to the first pattern 52 of the dielectric green sheet 51 and the first pattern 52 are stacked corresponds to the section where the sheet containing the $BaTiO_3$ powder as the main component ceramic and the pattern of the metal conductive paste are alternately stacked. The section where the part protruding outward from the first pattern 52 of the dielectric green sheet 51 and the second pattern 53 are stacked corresponds to the side margin section disposed on each of the side faces of the multilayer structure.

Figure 9:
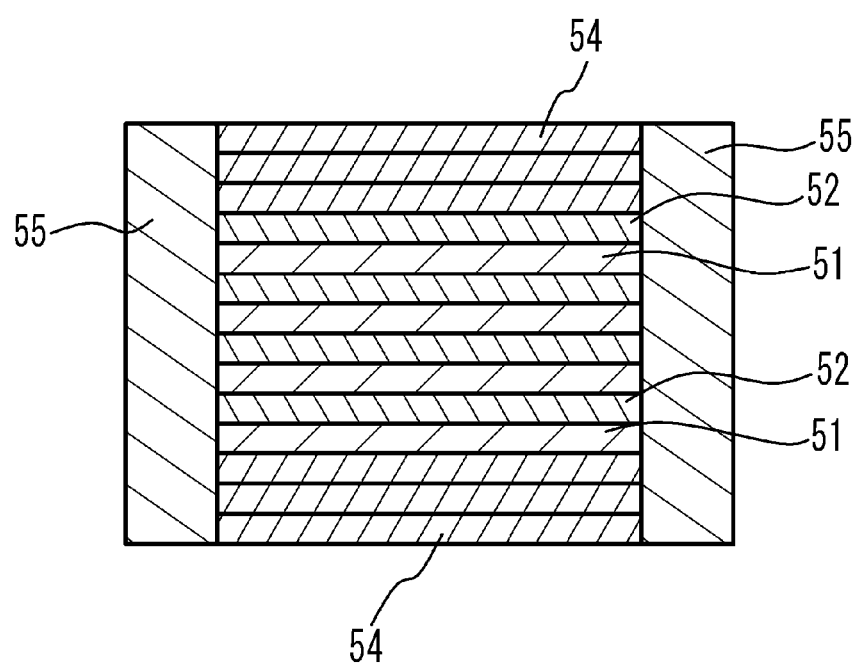
FIG. 9 is a diagram illustrating the stacking process.

The side margin section may be attached to or applied to each of the side faces of the multilayer structure. Specifically, the multilayer structure is obtained by stacking the predetermined numbers (for example, 200 to 500) of the dielectric green sheets 51, the first patterns 52, and the second patterns 53 so that the internal electrode layers 12 and the dielectric layers 11 are alternated with each other and the end edges of the internal electrode layers 12 are alternately exposed to both edge faces in the length direction of the dielectric layer 11 so as to be alternately led out to a pair of external electrodes of different polarizations. Then, the cover sheets 54, which are to be the cover layers 13, are stacked on and under the stacked dielectric green sheets 51, and then compressed. Thereafter, the resulting multilayer structure is cut into a predetermined size to obtain a multilayer structure having two edge faces to which the patterns of the internal electrode layers 12 are alternately exposed and two side faces to which the patterns of the internal electrode layer 12 are all exposed. Then, as illustrated in FIG. 9, a sheet 55 formed of a side margin paste may be attached to each of the side faces of the multilayer structure or the side margin paste may be applied to each of the side faces of the multilayer structure to form the side margin sections. The margin paste may be used as the side margin paste. The part formed on each of the side faces of the multilayer structure having the dielectric green sheets 51 and the first patterns 52 alternately stacked of the side margin paste corresponds to the side margin section.

[Firing (S3)]

A binder is removed from the resulting ceramic multilayer structure in a nitrogen ($N_2$) atmosphere, and then a Ni paste to be the base for the external electrodes 20a and 20b is applied by dipping, and then fired in a reductive atmosphere with an oxygen partial pressure of $10^{-5}$ to $10^{-8}$ atm in a temperature range of 1100° C. to 1300° C. for 10 minutes to 2 hours. Through the firing, the main component metal (for example, Ni) of the internal electrode layer 12 is diffused into the cover layer 13, and the second part P2 is densified.

Furthermore, in the present embodiment, the rate of temperature increase in the firing process is adjusted to form the relatively high porous section 13a and the peripheral section 13b (more specifically, the first part P1, the third parts P3, and the fourth parts P4) within the cover layer 13. Specifically, as illustrated in FIG. 10A, a first average rate R1 of temperature increase (=(T1−Ts)/(t1/60)) from the start of firing to time t1 is adjusted to be 400° C./hour or greater, and a second average rate R2 of temperature increase (=(T2−T1)/{(t2−t1)/60}) from time t1 to time t2 is adjusted to be 20000° C./hour or greater, and the ratio of the first average rate R1 of temperature increase to the second average rate R2 of temperature increase (=R2/R1) is adjusted to be 50 or greater.

By adjusting the first average rate R1 of temperature increase, the second average rate R2 of temperature increase, and the ratio (R2/R1) as described above, the relatively high porous section 13a and the peripheral section 13b are both formed within a single member (the cover layer 13). To improve the denseness of the second part P2, for example, among a plurality of the cover sheets 54 forming the cover layer 13, one or some cover sheets 54 to be arranged closer to the capacitance section 14 may be configured to contain an oxide of the main component metal of the internal electrode layer 12.

Figure 10A:
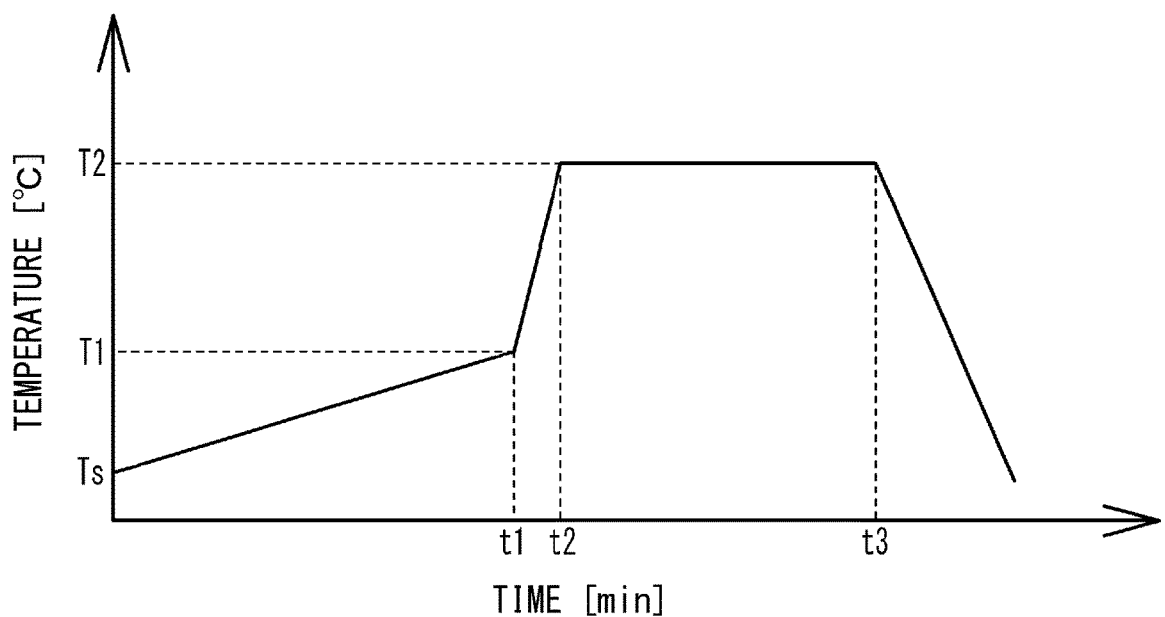
FIGS. 10A-10B are diagrams for describing a rate of temperature increase in a firing process.
Figure 10B:
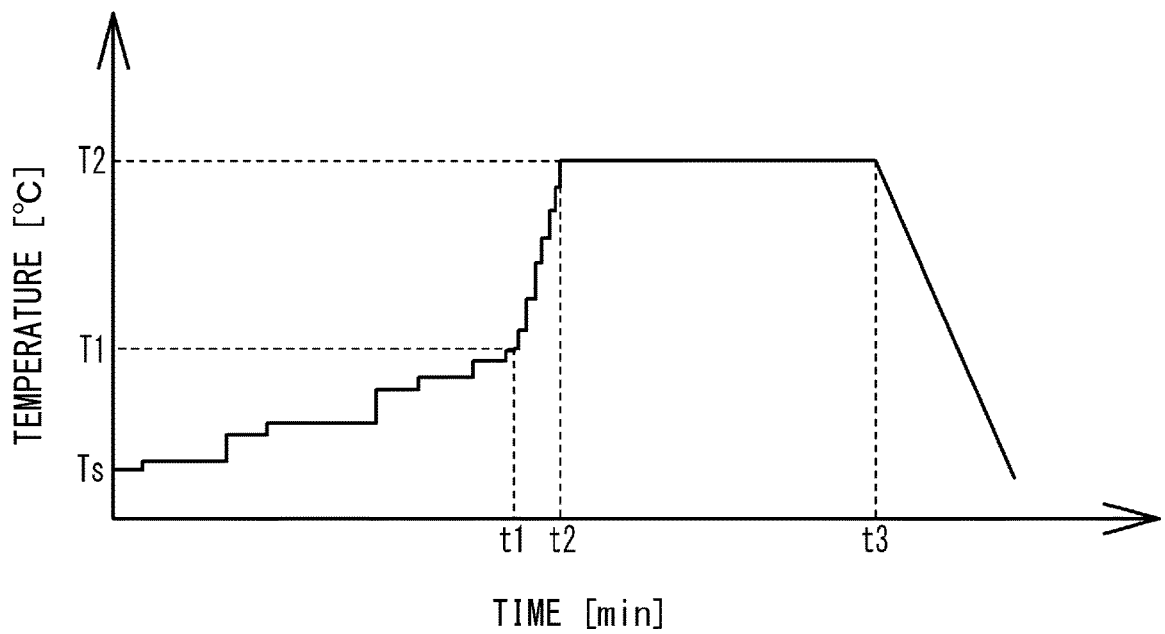

In FIG. 10A, the temperature is increased at a constant rate during the period from the start of firing to time t1 and the temperature is increased at a constant rate during the period from time t1 to time t2. However, as illustrated in FIG. 10B, the temperature may be increased in stages. As described above, the multilayer ceramic capacitor 100 is obtained.

[Re-Oxidizing (S4)]

Thereafter, the re-oxidizing process may be performed in a $N_2$ gas atmosphere in a temperature range of 600° C. to 1000° C.

[Plating (S5)]

Thereafter, a metal such as Cu, Ni, or Sn may be coated on each of the external electrodes 20a and 20b by plating.

In the manufacturing method in accordance with the present embodiment, the relatively high porous section 13a of which the pore ratio is greater than that in the second part P2 of the peripheral section 13b can be formed in the cover layer 13 by adjusting the rate of temperature increase during firing of the ceramic multilayer structure as described above. This structure inhibits the crack generated in the cover layer 13 by an external shock from reaching the capacitance section.

In the above embodiment, the multilayer ceramic capacitor has been described as an example of the ceramic electronic component. However, the ceramic electronic component is not limited to the multilayer ceramic capacitor. For example, the ceramic electronic component may be other electronic components such as a varistor and a thermistor.

EXAMPLES

The multilayer ceramic capacitor in accordance with the embodiment was fabricated, and the reliability thereof was examined.

Additives were added to barium titanate powder and were sufficiently wet-blended and crushed in a ball mill to obtain a dielectric material. Additives were added to barium titanate powder and were sufficiently wet-blended and crushed in a ball mill to obtain a margin material. Additives were added to barium titanate powder and were sufficiently wet-blended and crushed in a ball mill to obtain a cover material.

An organic binder and solvents were added to the dielectric material, and the dielectric green sheets 51 were made using a doctor blade method. The organic binder was a butyral-based binder. The solvents were toluene and ethyl alcohol. The first pattern 52 of the metal conductive paste was printed on the resulting dielectric green sheet 51. Then, 500 dielectric green sheets 51 on which the respective first patterns 52 are printed were stacked so that the positions of the first patterns 52 are alternately shifted. An organic binder and solvents were added to the cover material, and the cover sheets 54 were made using a doctor blade method. The organic binder was a butyral-based binder. The solvents were toluene and ethyl alcohol. Thereafter, the cover sheets 54 were stacked on and under the stacked dielectric green sheets 51. The resulting multilayer structure was heated and compressed, and was then cut into a predetermined chip size.

Thereafter, a conductive paste for external electrode containing a metal filler, a glass component, a binder, and solvents was applied to the multilayer structure, dried, and fired to obtain a multilayer chip. The pore ratio in the relatively high porous section 13a and the pore ratio in the peripheral section 13b were varied by varying the first average rate R1 of temperature increase and the second average rate R2 of temperature increase during firing.

Examples 1 to 6

One hundred multilayer ceramic capacitors 100 were fabricated for different pore ratios in the relatively high porous section 13a and different pore ratios in the first part P1, the second part P2, and the third part P3 of the peripheral section 13b.

In the examples and the comparative examples described hereinafter, the pore ratio was calculated in the manner described above. That is, each chip was polished so that a cross-section at the center part of the chip could be observed, and the cross-section was observed using a scanning electron microscope (SEM). Then, a plurality of measurement spots were defined as described above, and at each of the measurement spots, the total area of pores existing in the measurement spot and the area of the measurement spot were determined from the corresponding SEM cross-sectional image. From these measured data, the pore ratio of each measurement spot was calculated as (the total area of pores)/(the area of the measurement spot). The ImageJ software was used as image processing software.

In the examples and the comparative examples, the relatively high porous section 13a and the peripheral section 13b and their boundaries were determined in the manner described above. That is, each chip was polished so that a cross-section at the center part of the chip could be observed, and the cross-section was then observed using a scanning electron microscope (SEM). In order to determine the relatively high porous section 13a and the part P1/P2 and their respective boundaries, a plurality of measurement spots were defined along the stacking direction of the multilayer structure in the cross-section of the cover layer 13, and at each of the plurality of measurement spots, the pore ratio was calculated from the corresponding SEM image as the area ratio of (the total area of pores)/(the spot area), as described above. This way, local values of the pore ratio were calculated along a vertical virtual line along the stacking direction. Then, two adjacent measurement spots that had the largest difference in pore ratio were identified, if existed, and a line between such two adjacent measurement spots was determined as a boundary between the relatively high porous section 13a and the part P1/P2. The side of a higher pore ratio was determined to be the relatively high porous section 13a and the other side was determined to be part P1 or P2 depending on whether it was above or below the relatively high porous section 13a.

In order to determine the relatively high porous section 13a and the part P3 and their boundaries, another plurality of measurement spots were defined along in the length direction of the cover layer 13 in the cross-section of the cover layer 13, and at each of such a plurality of measurement spots, the pore ratio was calculated from the corresponding SEM image as the area ratio of (the total area of pores)/(the spot area), as described above. This way, local values of the pore ratio were calculated along a horizontal virtual line perpendicular to the stacking direction. Then, two adjacent measurement spots that had the largest difference in pore ratio were identified, if existed, and a line between such two adjacent measurement spots was determined as a boundary between the relatively high porous section 13a and the part P3.

The thickness of each of the parts P1 to P3 was measured in the SEM image.

As listed in Table 1, in the example 1, the measured pore ratio in the relatively high porous section 13a was 1.0%. The first part P1 and the third parts P3 of the peripheral section 13b were not found. The measured pore ratio in the second part P2 of the peripheral section 13b was 0.7%.

In the example 2, the measured pore ratio in the relatively high porous section 13a was 1.2%, the measured pore ratio in each of the first part P1 and the third parts P3 of the peripheral section 13b was 1.1%, and the measured pore ratio in the second part P2 of the peripheral section 13b was 1.0%.

In the example 3, the measured pore ratio in the relatively high porous section 13a was be 2.4%, the measured pore ratio in each of the first part P1 and the third parts P3 of the peripheral section 13b was 1.4%, and the measured pore ratio in the second part P2 of the peripheral section 13b was 1.2%.

In the example 4, the measured pore ratio in the relatively high porous section 13a was 1.4%, the measured pore ratio in each of the first part P1 and the third part P3 of the peripheral section 13b was 0.2%, and the measured pore ratio in the second part P2 of the peripheral section 13b was 0.2%.

In the example 5, the measured pore ratio in the relatively high porous section 13a was 15%, the measured pore ratio in each of the first part P1 and the third parts P3 of the peripheral section 13b was 0.3%, and the measured pore ratio in the second part P3 of the peripheral section 13b was 0.2%.

In the example 6, the measured pore ratio in the relatively high porous section 13a was 19%, the measured pore ratio in each of the first part P1 and the third parts P3 of the peripheral section 13b was 0.5%, and the measured pore ratio in the second part P2 of the peripheral section 13b was 0.3%.

Additionally, in the example 1, the measured thickness T of the cover layer 13 in the stack direction was 180 μm, the measured thickness T2 of the second part P2 in the stack direction was 20 μm. In the examples 2 and 3, the measured thickness T of the cover layer 13 in the stack direction was 180 μm, the measured thickness T1 of the first part P1 in the stack direction was 18 μm, the measured thickness T2 of the second part P2 in the stack direction was 20 μm, and the measured thickness T3 of the third part P3 in the length direction was 18 μm. In the examples 4 to 6, the measured thickness T of the cover layer 13 in the stack direction was 180 μm, the measured thickness T1 of the first part P1 in the stack direction was 18 μm, the measured thickness T2 of the second part P2 in the stack direction was 18 μm, and the measured thickness T3 of the third part P3 in the length direction was 18 μm.

Comparative Examples 1 to 4

As listed in Table 1, in the comparative example 1, the measured pore ratio in the center section (corresponding to the relatively high porous section 13a of the embodiments) of the cover layer 13 was 0.3%, the measured pore ratio in each of the top section corresponding to the first part P1 and the lateral sections corresponding to the third parts P3 of the peripheral section 13b was 0.2%, the measured pore ratio in the second part P2 of the peripheral section 13b was 0.2%, and other conditions were adjusted to be the same as those of the examples 1 to 3.

In the comparative example 2, the measured pore ratio in the center section (corresponding to the relatively high porous section 13a of the embodiments) was to be 0.6%, the measured pore ratio in each of the first part P1 and the third parts P3 of the peripheral section 13b was 0.6%, the measured pore ratio in the second part P2 of the peripheral section 13b was 0.3%, and other conditions were adjusted to be the same as those of the examples 1 to 3.

In the comparative example 3, the measured pore ratio in the center section (corresponding to the relatively high porous section 13a of the embodiments) was 0.1%, the measured pore ratio in each of the first part P1 and the third parts P3 of the peripheral section 13b was 0.1%, the measured pore ratio in the second part P2 of the peripheral section 13b was 0.1%, and other conditions were adjusted to be the same as those of the examples 4 to 6.

In the comparative example 4, the measured pore ratio in the center section (corresponding to the relatively high porous section 13a) was 0.5%, the measured pore ratio in each of the first part P1 and the third parts P3 of the peripheral section 13b was 0.2%, the measured pore ratio in the second part P2 of the peripheral section 13b was 0.2%, and other conditions were adjusted to be the same as those of the examples 4 to 6.

TABLE 1

| | T1 [μm] | T2 [μm] | T3 [μm] | T [μm] | T1/T | T2/T | T3/T | Pore ratio in relatively high porous section (%) | Pore ratio in peripheral section (%) | |
|---|---|---|---|---|---|---|---|---|---|---|
| | | | | | | | | | P1, P3 | P2 |
| Example 1 | 0 | 20 | 0 | 180 | 0 | 0.11 | 0 | 1.0 | — | 0.7 |
| Example 2 | 18 | 20 | 18 | 180 | 0.10 | 0.11 | 0.10 | 1.2 | 1.1 | 1.0 |
| Example 3 | 18 | 20 | 18 | 180 | 0.10 | 0.11 | 0.10 | 2.4 | 1.4 | 1.2 |
| Example 4 | 18 | 18 | 18 | 180 | 0.10 | 0.10 | 0.10 | 1.4 | 0.2 | 0.2 |
| Example 5 | 18 | 18 | 18 | 180 | 0.10 | 0.10 | 0.10 | 15 | 0.3 | 0.2 |
| Example 6 | 18 | 18 | 18 | 180 | 0.10 | 0.10 | 0.10 | 19 | 0.5 | 0.3 |
| Comparative Example 1 | 18 | 20 | 18 | 180 | 0.10 | 0.11 | 0.10 | 0.3 | 0.2 | 0.2 |
| Comparative Example 2 | 18 | 20 | 18 | 180 | 0.10 | 0.11 | 0.10 | 0.6 | 0.6 | 0.3 |
| Comparative Example 3 | 18 | 18 | 18 | 180 | 0.10 | 0.10 | 0.10 | 0.1 | 0.1 | 0.1 |
| Comparative Example 4 | 18 | 18 | 18 | 180 | 0.10 | 0.10 | 0.10 | 0.5 | 0.2 | 0.2 |

[Shock Test]

An external shock was applied to the samples of the examples 1 to 6 and the comparative examples 1 to 4, and it was checked whether a crack reached the capacitance section. The samples were polished so that the cross-section could be observed without damaging a recess formed according to JIS R1610, which is the standard for the hardness testing method of fine ceramics, and the cross-section was observed to determine whether the extension of the crack reached the capacitance section.

The results are presented in Table 2. When the ratio of the number of samples in which the crack reached the capacitance section to the total number of samples was less than 0.1, the result was evaluated as "Acceptable". In each of the comparative examples 1 to 4, the ratio of the number of samples in which the crack reached the capacitance section to the total number of samples was 0.1 or greater. This is considered because the cover layer 13 did not have flexibility sufficient to mitigate the external shock because the pore ratio in the center section (corresponding to the relatively high porous section 13a of the embodiments) was less than 1%.

By contrast, in the examples 1 to 6, there was no sample in which the crack reached the capacitance section in the shock test. This is considered because the cover layer 13 had flexibility sufficient to mitigate the external shock because the pore ratio in the relatively high porous section 13a was greater than the pore ratio in at least a part of the peripheral section 13b, and was 1% or greater.

TABLE 2

| | Ratio of samples in which crack reached capacitance section | Evaluation result |
|---|---|---|
| Example 1 | 0/100 | Acceptable |
| Example 2 | 0/100 | Acceptable |
| Example 3 | 0/100 | Acceptable |
| Example 4 | 0/100 | Acceptable |
| Example 5 | 0/100 | Acceptable |
| Example 6 | 0/100 | Acceptable |
| Comparative Example 1 | 94/100 | Rejectable |
| Comparative Example 2 | 22/100 | Rejectable |
| Comparative Example 3 | 98/100 | Rejectable |
| Comparative Example 4 | 12/100 | Rejectable |

[Moisture Resistance Test]

For each of the examples 1 to 3, 500 samples were fabricated, and were subjected to a moisture resistance test. A voltage of 10 V was applied to each sample at 95% relative humidity for 500 hours. Then, the direct current resistance of the sample was measured using an insulation resistance (IR) meter, and when the measured value was 1 MΩ or less, the sample was determined to be rejectable. The number of rejectable samples was counted.

Results are presented in Table 3. As presented in Table 3, in the examples 1 and 2 where the pore ratio in the second part P2 of the peripheral section 13b was 1% or less, there was no rejectable sample. This reveals that the pore ratio in the second part P2 is preferably 1% or less.

TABLE 3

| | Moisture resistance test |
|---|---|
| Example 1 | 0/500 |
| Example 2 | 0/500 |
| Example 3 | 3/500 |

[Investigation for Crack Generated in a Boundary Face]

For each of the examples 4 to 6, 100 samples were fabricated, and whether a crack was generated in the boundary face between the relatively high porous section 13a and the first part P1 of the peripheral section 13b, whether a crack was generated in the boundary face between the relatively high porous section 13a and the second part P2, and whether a crack was generated in the boundary face between the relatively high porous section 13a and the third part P3 were checked.

Results are presented in Table 4. As presented in Table 4, in the examples 4 and 5, no crack was generated in the boundary face between the relatively high porous section 13a and the first part P1 of the peripheral section 13b, in the boundary face between the relatively high porous section 13a and the second part P2, and in the boundary face between the relatively high porous section 13a and the third part P3. This is considered because structural anomaly was not generated in the cover layer 13 because the pore ratio in the relatively high porous section 13a was 15% or less, and the difference (dense-coarse difference) between the pore ratio in the relatively high porous section 13a and the pore ratio in the peripheral section 13b was within an appropriate range. Therefore, it is revealed that the pore ratio in the relatively high porous section 13a is preferably 15% or less.

TABLE 4

| | Generation of crack in boundary face |
|---|---|
| Example 4 | 0/100 |
| Example 5 | 0/100 |
| Example 6 | 6/100 |

Examples 7 to 10

For each of examples 7 to 10, 500 samples of the multilayer ceramic capacitor 100 were fabricated as presented in Table 5.

In the example 7, the measured pore ratio in the relatively high porous section 13a was 8%, the measured pore ratio in each of the first part P1 and the third parts P3 of the peripheral section 13b was 0.2%, and the measured pore ratio in the second part P2 of the peripheral section 13b was 0.2%.

In the example 8, the measured pore ratio in the relatively high porous section 13a was 10%, the measured pore ratio in each of the first part P1 and the third parts P3 of the peripheral section 13b was 0.6%, and the measured pore ratio in the second part P2 of the peripheral section 13b was 0.2%.

In the example 9, the measured pore ratio in the relatively high porous section 13a was 12%, the measured pore ratio in each of the first part P1 and the third parts P3 of the peripheral section 13b was 1.0%, and the measured pore ratio in the second part P2 of the peripheral section 13b was 0.2%.

In the example 10, the measured pore ratio in the relatively high porous section 13a was 14%, the measured pore ratio in each of the first part P1 and the third parts P3 of the peripheral section 13b was 1.4%, and the measured pore ratio in the second part P2 of the peripheral section 13b was adjusted to be 0.3%.

In the examples 7 to 10, the measured thickness T of the cover layer 13 in the stack direction was 180 μm, the measured thickness T1 of the first part P1 in the stack direction was 18 μm, the measured thickness T2 of the second part P2 in the stack direction was 18 μm, and the measured thickness T3 of the third part P3 in the direction in which the external electrodes 20a and 20b are opposite to each other was 18 μm.

TABLE 5

|  | T1 [μm] | T2 [μm] | T3 [μm] | T [μm] | T1/T | T2/T | T3/T | Pore ratio in relatively high porous section (%) | Pore ratio in peripheral section (%) | |
|---|---|---|---|---|---|---|---|---|---|---|
|  |  |  |  |  |  |  |  |  | P1, P3 | P2 |
| Example 7 | 18 | 18 | 18 | 180 | 0.10 | 0.10 | 0.10 | 8 | 0.2 | 0.2 |
| Example 8 | 18 | 18 | 18 | 180 | 0.10 | 0.10 | 0.10 | 10 | 0.6 | 0.2 |
| Example 9 | 18 | 18 | 18 | 180 | 0.10 | 0.10 | 0.10 | 12 | 1.0 | 0.2 |
| Example 10 | 18 | 18 | 18 | 180 | 0.10 | 0.10 | 0.10 | 14 | 1.4 | 0.3 |

[Plating Solution Resistance Test]

For each of the examples 7 to 10, 500 samples were subjected to a load test in a high-temperature environment. A voltage of 10 V was applied to each sample in a 105° C. environment for 100 hours, and the direct current resistance was measured using an IR meter. When the measured value was 1 MΩ or less, the sample was determined to be rejectable. The number of rejectable samples was counted.

Results are presented in Table 6. As presented in Table 6, in the examples 7 to 9, penetration of the plating solution was not observed. This is considered because the resistance to the plating solution was secured because the pore ratio in each of the first part P1 and the third parts P3, which exist in the outermost part of the cover layer 13, of the peripheral section 13b was 1% or less. Therefore, it is revealed that it is preferable that the pore ratio in the first part P1 and the pore ratio in each of the third parts P3 are both 1% or less.

TABLE 6

|  | Penetration of plating solution |
|---|---|
| Example 7 | 0/500 |
| Example 8 | 0/500 |
| Example 9 | 0/500 |
| Example 10 | 13/500 |

Examples 11 to 15

Six hundred multilayer ceramic capacitors 100 were fabricated for different pore ratios in the relatively high porous section 13a, different pore ratios in the first part P1, the second part P2, and the third part P3 of the peripheral section 13b, different thicknesses T of the cover layer 13 in the stack direction, different thicknesses T2 of the second part P2 in the stack direction, and different thicknesses T3 of the third part P3 in the length direction.

As presented in Table 7, in the example 11, the measured pore ratio in the relatively high porous section 13a was 15%, the measured pore ratio in each of the first part P1 and the third parts P3 of the peripheral section 13b was 0.3%, and the measured pore ratio in the second part P2 of the peripheral section 13b was 0.2%. The measured thickness T of the cover layer 13 was 180 μm, the measured thickness T1 of the first part P1 was 3 μm, the measured thickness T2 of the second part P2 was 20 μm, and the measured thickness T3 of the third part P3 was 3 μm.

In the example 12, the measured pore ratio in the relatively high porous section 13a was 12%, the measured pore ratio in each of the first part P1 and the third parts P3 of the peripheral section 13b was 0.1%, and the measured pore ratio in the second part P2 of the peripheral section 13b was 0.06%. The measured thickness T of the cover layer 13 was 180 μm, the measured thickness T1 of the first part P1 was 65 μm, the measured thickness T2 of the second part P2 was 36 μm, and the measured thickness T3 of the third part P3 was 65 μm.

In the example 13, the measured pore ratio in the relatively high porous section 13a was 15%, the measured pore ratio in each of the first part P1 and the third parts P3 of the peripheral section 13b was 0.3%, and the measured pore ratio in the second part P2 of the peripheral section 13b was 0.2%. Additionally, the measured thickness T of the cover layer 13 was 180 μm, the measured thickness T1 of the first part P1 was 6 μm, the measured thickness T2 of the second part P2 was 6 μm, and the measured thickness T3 of the third part P3 in the length direction was 6 μm.

In the example 14, the measured pore ratio in the relatively high porous section 13a was 15%, the measured pore ratio in each of the first part P1 and the third part P3 of the peripheral section 13b was 0.3%, and the measured pore ratio in the second part P2 of the peripheral section 13b was 0.2%. Additionally, the measured thickness T of the cover layer 13 was 180 μm, the measured thickness T1 of the first part P1 was 18 μm, the measured thickness T2 of the second part P2 was 20 μm, and the measured thickness T3 of the third part P3 was 18 μm.

In the example 15, the measured pore ratio in the relatively high porous section 13a was 14%, the measured pore ratio in each of the first part P1 and the third parts P3 of the peripheral section 13b was 0.2%, and the measured pore ratio in the second part P2 of the peripheral section 13b was 0.1%. Additionally, the measured thickness T of the cover layer 13 was 180 μm, the measured thickness T1 of the first part P1 was 55 μm, the measured thickness T2 of the second part P2 was 36 μm, and the measured thickness T3 of the third part P3 was 55 μm.

TABLE 7

|  | T1 [μm] | T2 [μm] | T3 [μm] | T [μm] | T1/T | T2/T | T3/T | Pore ratio in relatively high porous section (%) | Pore ratio in peripheral section (%) | |
|---|---|---|---|---|---|---|---|---|---|---|
|  |  |  |  |  |  |  |  |  | P1, P3 | P2 |
| Example 11 | 3 | 20 | 3 | 180 | 0.02 | 0.11 | 0.02 | 15 | 0.3 | 0.2 |
| Example 12 | 65 | 36 | 65 | 180 | 0.36 | 0.20 | 0.36 | 12 | 0.1 | 0.06 |
| Example 13 | 6 | 6 | 6 | 180 | 0.03 | 0.03 | 0.03 | 15 | 0.3 | 0.2 |
| Example 14 | 18 | 20 | 18 | 180 | 0.10 | 0.11 | 0.10 | 15 | 0.3 | 0.2 |
| Example 15 | 55 | 36 | 55 | 180 | 0.31 | 0.20 | 0.31 | 14 | 0.2 | 0.1 |

[Shock Test]

For each of the examples 11 to 15, 100 samples were subjected to the shock test under the same conditions as those of the examples 1 to 6 and the comparative examples 1 to 4.

[Plating Solution Resistance Test]

Plating solution resistance was examined for the samples having no crack of the examples 11 to 15 under the same conditions as those of the examples 7 to 10.

Results are presented in Table 8. As presented in Table 8, in the examples 13 to 15 in which the ratio of the thickness T1 of the first part P1 to the thickness T of the cover layer 13 (T1/T) and the ratio of the thickness T3 of the third part P3 to the thickness T of the cover layer 13 (T3/T) were both 0.03 or greater and 0.31 or less and the ratio of the thickness T2 of the second part P2 to the thickness T of the cover layer 13 (T2/T) was 0.03 or greater and 0.20 or less, no crack was observed to reach the capacitance section and no penetration of the plating solution to the capacitance section was also observed. Therefore, it is revealed that it is preferable that the ratio of the thickness T1 of the first part P1 to the thickness T of the cover layer 13 (T1/T) and the ratio of the thickness T3 of the third part P3 to the thickness T of the cover layer 13 (T3/T) are both 0.03 or greater and 0.31 or less and the ratio of the thickness T2 of the second part P2 to the thickness T of the cover layer 13 (T2/T) is 0.03 or greater and 0.20 or less.

TABLE 8

|  | Ratio of samples in which crack reached capacitance section | Evaluation result | Penetration of plating solution |
|---|---|---|---|
| Example 11 | 0/100 | Acceptable | 7/500 |
| Example 12 | 8/100 | Acceptable | 0/500 |
| Example 13 | 0/100 | Acceptable | 0/500 |
| Example 14 | 0/100 | Acceptable | 0/500 |
| Example 15 | 0/100 | Acceptable | 0/500 |

The influence of the first average rate R1 of temperature increase and the second average rate R2 of temperature increase on the pore ratio in the relatively high porous section 13a and the pore ratio in the peripheral section 13b was examined.

Examples 16 and 17

As presented in Table 9, in the example 16, the first average rate R1 of temperature increase was adjusted to be 400° C./hour, and the second average rate R2 of temperature increase was adjusted to be 20000° C./hour. The ratio of the rate of temperature increase (R2/R1) is 50.

In the example 17, the first average rate R1 of temperature increase was adjusted to be 400° C./hour, and the second average rate R2 of temperature increase was adjusted to be 30000° C./hour. The ratio of the rate of temperature increase (R2/R1) is 75.

Comparative Examples 5 and 6

In the comparative example 5, the first average rate R1 of temperature increase was adjusted to be 400° C./hour, and the second average rate R2 of temperature increase was adjusted to be 1000° C./hour. The ratio of the rate of temperature increase (R2/R1) is 2.5.

In the comparative example 6, the first average rate R1 of temperature increase was adjusted to be 400° C./hour, and the second average rate R2 of temperature increase was adjusted to be 10000° C./hour. The ratio of the rate of temperature increase (R2/R1) is 25.

TABLE 9

|  | First average rate R1 of temperature increase [° C./h] | Second average rate R2 of temperature increase [° C./h] | Ratio of rate of temperature increase R2/R1 | Pore ratio in relatively high porous section (%) | Pore ratio in peripheral section (%) | |
|---|---|---|---|---|---|---|
|  |  |  |  |  | P1, P3 | P2 |
| Example 16 | 400 | 20000 | 50 | 1.4 | 0.2 | 0.2 |
| Example 17 | 400 | 30000 | 75 | 15 | 0.3 | 0.2 |
| Comparative Example 5 | 400 | 1000 | 2.5 | 0.1 | 0.1 | 0.1 |
| Comparative Example 6 | 400 | 10000 | 25 | 0.5 | 0.2 | 0.2 |

As presented in Table 9, in the comparative example 5, the pore ratio in the relatively high porous section 13a could not be made to be greater than the pore ratio in the second part P2 of the peripheral section 13b. In the comparative example 5, the pore ratio in the relatively high porous section 13a was identical to the pore ratio in the peripheral section 13b, and it was impossible to identify the relatively high porous section 13a. Thus, the pore ratios were measured under the assumption that the center portion of the cover layer 13 was the relatively high porous section 13a, and the peripheral portion of the cover layer 13 was the peripheral section 13b. Additionally, in the comparative example 6, the pore ratio in the relatively high porous section 13a did not reach the pore ratio (1% or greater) that can inhibit a crack from reaching the capacitance section. By contrast, in the examples 16 and 17, the pore ratio in the relatively high porous section 13a was higher than the pore ratio in the second part P2 of the peripheral section 13b, and the pore ratio in the relatively high porous section 13a could be made to be 1% or greater.

Although the embodiments of the present invention have been described in detail, it is to be understood that the various change, substitutions, and alterations could be made hereto without departing from the spirit and scope of the invention.

What is claimed is:

1. A ceramic electronic component comprising:
    a multilayer chip including a multilayer structure, which includes dielectric layers and internal electrode layers that are alternately stacked, and cover layers respectively disposed on a top face and a bottom face of the multilayer structure in a first direction in which the dielectric layers and the internal electrode layers are alternately stacked, the dielectric layers being mainly composed of ceramic, the multilayer chip having a substantially rectangular parallelepiped shape, lateral ends of the internal electrode layers being alternately exposed to two edge faces opposite to each other in the second direction of the multilayer structure,
    wherein each of the cover layers includes a relatively high porous section and a first relatively less porous section having a pore ratio less than a pore ratio of the relatively high porous section, the relatively high porous section laterally spreading and spanning an entire length of the cover layer in a second direction orthogonal to the first direction, or spanning a substantially entire length of the cover layer except for lateral end portions of the cover layer, the pore ratio of the relatively high porous section being 1% or greater, the first relatively less porous section being interposed between the relatively high porous section and the multilayer structure,
    wherein each of the cover layers further includes a second relatively less porous section that is located further out than the relatively high porous section in the first direction, a pair of third relatively less porous sections, as the lateral end portions, sandwiching the relatively high porous section therebetween in the second direction in which the two edge faces are opposite to each other, and a pair of fourth relatively less porous sections sandwiching the relatively high porous section therebetween in a third direction perpendicular to the first direction and the second direction, and
    wherein in each of the cover layers, the following conditions are satisfied:

$0.03 \leq T1/T \leq 0.31$, $0.03 \leq T2/T \leq 0.20$, and $0.03 \leq T3/T \leq 0.31$, where T represents a thickness of the cover layer in the first direction, T1 represents a thickness of the second relatively less porous section in the first direction, T2 represents a thickness of the first relatively less porous section in the first direction, and T3 represents a thickness of the third relatively less porous section in the second direction.

2. The ceramic electronic component according to claim 1, wherein the pore ratio in the relatively high porous section is 15% or less.

3. The ceramic electronic component according to claim 1, wherein the pore ratio in the first relatively less porous section is less than 1%.

4. The ceramic electronic component according to claim 1, wherein
    a pore ratio in the second relatively less porous section is less than 1%, and a pore ratio in the third relatively less porous section is less than 1%.

5. The ceramic electronic component according to claim 1, wherein each of the dielectric layers contains $Ba_{1-x-y}Ca_xSr_yTi_{1-z}Zr_zO_3$ ($0 \leq x \leq 1$, $0 \leq y \leq 1$, $0 \leq z \leq 1$).

6. The ceramic electronic component according to claim 1, wherein an average thickness of each of the dielectric layers is 1 µm or less.

7. A method of manufacturing a ceramic electronic component, the method comprising:
    alternately stacking ceramic green sheets for dielectric layers and conductive pastes for internal electrode layers to form a multilayer structure;
    disposing a cover sheet on each of outermost layers of the multilayer structure in a first direction, in which the ceramic green sheets and the conductive pastes are stacked, to form a ceramic multilayer structure; and
    firing the ceramic multilayer structure to form a multilayer chip,
    wherein in the firing, a first average rate R1 of temperature increase from a start of the firing to a first point in time is 400° C./hour or greater, a second average rate R2 of temperature increase from the first point in time to a second point in time is 20000° C./hour or greater, and a ratio (R2/R1) of the second average rate R2 of temperature increase to the first average rate R1 of temperature increase is 50 or greater.

* * * * *